H. T. Basye,
Preserving Sweet Potatoes.
No. 110,108. Patented Dec. 13, 1870.

Witnesses
H. Hamilton Johnson
Wm. H. Mix

Hedgemon T. Basye, Inventor
By his Attorneys,
Sherman & Johnson

United States Patent Office.

HEDGEMON T. BASYE, OF DYERSBURG, TENNESSEE.

Letters Patent No. 110,108, dated December 13, 1870.

IMPROVEMENT IN PRESERVING SWEET POTATOES.

The Schedule referred to in these Letters Patent and making part of the same.

*To all whom it may concern:*

Be it known that I, HEDGEMON T. BASYE, of Dyersburg, in the county of Dyer and State of Tennessee, have invented a new and useful Method of Preserving Sweet Potatoes; and I do hereby declare that the following is a full, clear, and exact description thereof, reference being had to the accompanying drawing which represents the means for carrying out said method, and in which—

Figure 1:
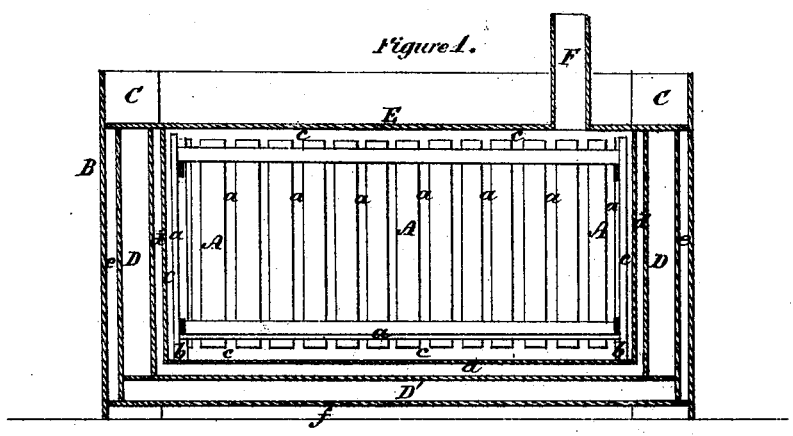
Figure 1 represents a vertical longitudinal section of a bin, constructed for keeping sweet potatoes, embracing my improvements.
Figure 2:
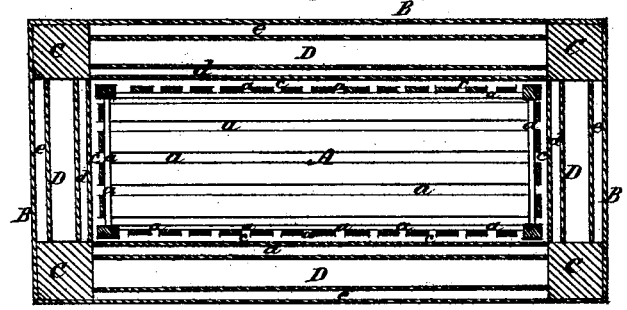
Figure 2 represents a vertical section.
Figure 3:
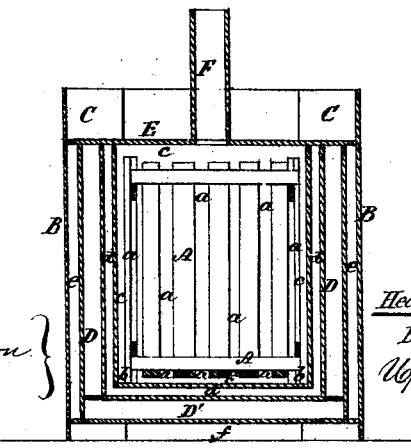

Figure 3, a horizontal section of the same.

My invention relates to preserving sweet potatoes; and

It consists in constructing a bin for that purpose, composed of a slatted crib for receiving the potatoes, and an inclosing case having air and division-chambers for separating and protecting the slatted crib from the influences of the elements, while the receiving-crib is surrounded with an air-chamber with which it is in communication through the spaces between the slats, so that the potatoes in the crib are kept perfectly dry, not only from dampness outside, but, by means of the dry-air chamber with which it communicates, all the watery matter expelled from the potatoes by shrinkage will pass therefrom through the spaces in the crib, and be absorbed by the dry air around the crib.

In the accompanying drawing—

A represents the crib, within which the potatoes are placed in layers of about ten inches deep, and separated by straw, to aid in absorbing the moisture expelled from the potatoes.

This crib is open at its top, and made of slats, so as to form open spaces, $a$, between said slats.

It is supported upon legs, $b$, and placed within the inner chamber of the inclosing-case B, so as to form an air-chamber, $c$, entirely around it, and with which it communicates through the spaces $a$ of the slats.

The inclosing-case B has a width and depth of about three feet, and of any desirable length. Its inner crib compartment is surrounded, except at the top, by a closed air-chamber, $d$, so as to insulate it from the outer case, and is supported by and between four posts, C, which also form the supports for the outer case B; which is also surrounded at its sides and ends by another closed chamber, $e$.

Between these air-chambers $d$ and $e$ a separating-chamber, D, is arranged around the sides, ends, and bottom of the inner compartment.

This separating-chamber D is filled with straw, shucks, fodder, sawdust, or charcoal, which, in connection with the closed air-chambers $d$ and $e$, maintains a uniform temperature within the crib A, and effectually prevents the penetration of dampness, keeping the potatoes perfectly dry.

The separating non-conducting chamber D' at the bottom of the bin does not communicate with those, D, at the sides and ends, so that the dampness from the ground will not pass up around the inner air-chamber.

A space, $f$, is left between the lower chamber D' and the ground, to keep the bottom floor dry.

The bin has a cover, E, which is provided with one or more pipes, F, to allow the dampness which rises from the potatoes to pass out from the crib and air-chamber.

The potatoes are always kept well covered with straw, and the top boards of the case B are removed to get at the potatoes. The outer case of the crib A rises above the latter, and is also covered with boards to turn the rain, leaving a space above the top of the crib which is filled with earth so as to render the top water-tight, leaving only the opening in the pipe F.

The bin is cheaply constructed of boards, and the crib of slats, and I have kept potatoes in this way from one season to another perfectly sound and dry.

Having described my invention,

I claim—

1. The combination of an inner crib, A, of slats and spaces $a$, with an inclosing-case, B, having a communicating air-chamber, $c$, between them, in the manner and for the purpose herein described.

2. In combination with an inner crib, A, of slats and spaces $a$, and a surrounding communicating chamber, $c$, an inclosing-case, B, having an inner and an outlet air-chamber, $d$ and $e$, and a separating non-conducting chamber, D', in the manner and for the purpose herein described.

In testimony whereof, I have hereto set my name.

HEDGEMON T. BASYE.

Witnesses:
A. E. H. JOHNSON,
T. H. UPPERMAN.